United States Patent [19]
Gregory et al.

[11] Patent Number: 5,756,692
[45] Date of Patent: May 26, 1998

[54] CHEMICAL COMPOUNDS

[75] Inventors: Peter Gregory, Bolton; Ronald Wynford Kenyon, Bridport; Paul Wight, Prestwich, all of United Kingdom

[73] Assignee: Zeneca Limited, London, England

[21] Appl. No.: 768,941

[22] Filed: Dec. 18, 1996

[30] Foreign Application Priority Data

Dec. 19, 1995 [GB] United Kingdom ............. 9525883

[51] Int. Cl.$^6$ ............. C09B 33/10; C09D 11/02; D06P 1/06
[52] U.S. Cl. ............. 534/796; 534/797; 106/31.48; 8/466
[58] Field of Search ............. 534/796, 797; 106/31.48; 8/466

[56] References Cited

U.S. PATENT DOCUMENTS

| | | | |
|---|---|---|---|
| 4,737,190 | 4/1988 | Shimada et al. | 106/31.48 |
| 4,908,062 | 3/1990 | Balmforth et al. | 106/31.48 |
| 5,262,527 | 11/1993 | Gregory et al. | 534/797 |
| 5,383,960 | 1/1995 | Gregory et al. | 106/31.48 |
| 5,609,673 | 3/1997 | Takimoto et al. | 106/22 K |
| 5,616,694 | 4/1997 | Kenyon et al. | 534/598 |

FOREIGN PATENT DOCUMENTS

| | | |
|---|---|---|
| 0 325 041 | 7/1989 | European Pat. Off. . |
| 07-090212 | 4/1995 | Japan . |

OTHER PUBLICATIONS

Chemical Abstracts, vol. 112, Abstr. No. 117332 (Toray Industries) (Feb. 22, 1989).
Chemical Abstracts, vol. 108, Abstr. No. 114198 (Mitsubishi Chemical Industries) (Jun. 16, 1987).
Abstract for Japanese Patent Appln. No. JP 01 141 965 A2 (Ricoh), Chemical Abstracts, 112: 58458 (1990).
Abstract for Japanese Patent Appln. No. JP 01 062 372 A2 (Ricoh), Chemical Abstracts, 111: 196985 (1989).
Abstract for German Patent Appln. No. DE 3 537 724 (Ricoh), Chemical Abstracts, 105: 99347 (1988).

*Primary Examiner*—Fiona T. Powers
*Attorney, Agent, or Firm*—Cushman Darby & Cushman IP Group; Pillsbury Madison & Sutro LLP

[57] ABSTRACT

A bisazo compound of the Formula (1) and salts thereof:

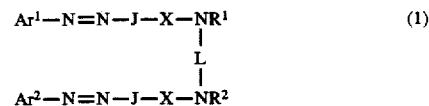

wherein the variables are as defined in the specification, the compounds of Formula (1) being free from fibre-reactive groups and any carboxyl substituents present in the compounds being attached in the form of one or more residue of the following formulae:

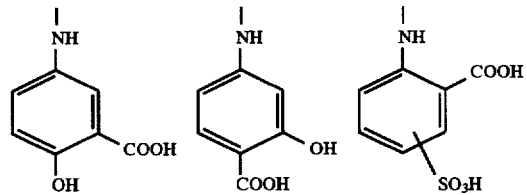

Also claimed are ink compositions comprising the above compound; a precess for printing substrates with the ink compositions using an ink-jet printer; paper, project slides and textile materials printed with the ink compositions; and a process for coloration of textile materials with the ink compositions.

10 Claims, No Drawings

CHEMICAL COMPOUNDS

The present invention relates to bisazo compounds, to ink compositions and solutions thereof, and to processes for use in printing and imaging technologies, especially those suitable for coloration of substrates including paper, plastics, textiles, metal and glass such as inkjet printing.

Inkjet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good waterfastness, light fastness and optical density, have fast fixation to the substrate and cause no clogging of the nozzle.

According to a first aspect of the present invention, there are provided bisazo compounds of the Formula (1) and salts thereof:

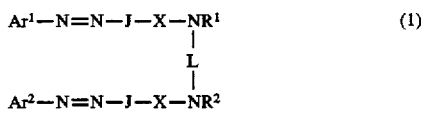

wherein $Ar^1$ and $Ar^2$, which may be the same or different, represent groups of the formula:

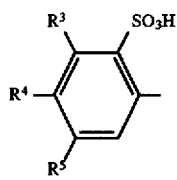

wherein each of $R^3$, $R^4$ and $R^5$, independently, represents H, halogen, alkyl, alkoxy or acylamino;

J represents

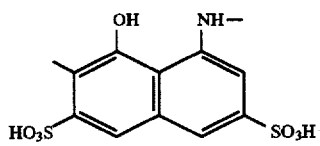

L represents a divalent organic linking group other than phenylene or optionally substituted vinylene bis-phenyl and each of $R^1$ and $R^2$, independently, represents H or optionally substituted hydrocarbyl or $R^1$ and/or $R^2$ together with L and the attached nitrogen atom(s) form a 5- or 6-membered ring provided that the group —$NR^1LNR^2$— does not comprise a residue of the formula:

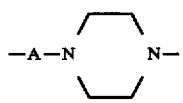

wherein A represents an optionally substituted alkylene group containing 2 or more carbon atoms, and X represents

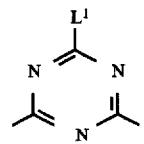

wherein $L^1$ represents —$OR^6$—, —$SR^6$ or —$NR^7R^8$ in which each of $R^6$, $R^7$ and $R^8$, independently, represents H or optionally substituted hydrocarbyl free from residues of the formula —A—$NR^9R^{10}$ wherein A is as defined above and each of $R^9$ and $R^{10}$, independently, represents H or optionally substituted hydrocarbyl or $R^9$ and $R^{10}$ together with the attached nitrogen atom form a 5- or 6-membered ring;

or $R^7$ and $R^8$ together with the attached nitrogen atom form a 5- or 6-membered ring other than a piperazine ring, the compounds of Formula (1) being free from fibre-reactive groups and any carboxyl substituents present in the compounds being attached in the form of one or more residue of the following formulae:

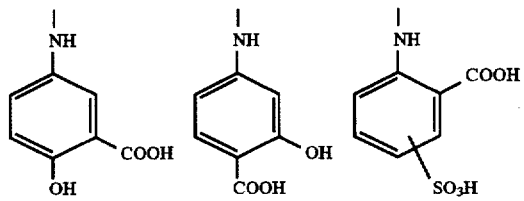

Halogen substituents which may be represented by $R^3$, $R^4$ and $R^5$ in the compounds of Formula 1 particularly include chloro substituents. Alkyl, alkoxy and acylamino substituents which may be represented by $R^3$, $R^4$ and $R^5$ particularly include $C_{1-6}$-alkyl groups, for example methyl, $C_{1-6}$-alkoxy groups, for example methoxy and $C_{1-6}$-acylamino groups, for example acetylamino.

Optionally substituted hydrocarbyl groups which may be represented by $R^1$, $R^2$, $R^6$, $R^7$ and $R^8$ include alkyl, substituted alkyl, alkenyl, substituted alkenyl, aryl and substituted aryl especially $C_{1-6}$-alkyl, substituted $C_{1-6}$-alkyl, $C_{3-4}$-alkenyl, phenyl and substituted phenyl. Any optional substituents on $R^1$, $R^2$, $R^6$, $R^7$ and $R^8$ are preferably independently selected from —OH and —$SO_3H$. When $R^7$ and $R^8$ together with the attached nitrogen atom form a 5- or 6-membered ring, they preferably form a morpholine or piperidine ring.

As indicated above, $R^6$, $R^7$ and $R^8$ must not be or contain groups of the formula —A—$NR^9R^{10}$ as defined. Thus, $R^6$, $R^7$ and $R^8$ must not be or contain groups such as aminoethyl or 3-dimethylaminopropyl.

The identity of the divalent organic linking group L is not critical provided it does not interfere with the performance of the compound and provided also that it is not phenylene or optionally substituted vinylene bisphenyl and the group —$NR^1LNR^2$— does not include a residue of the formula

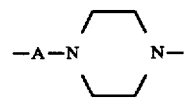

in which A is as hereinbefore defined. As examples of divalent organic linking groups, there may be mentioned:
(a) divalent aliphatic radicals, preferably those containing from 2 to 6 carbon atoms, such as ethylene, trimethylene, propylene, tetramethylene, alpha:beta-dimethylethylene and hexamethylene radicals. Hetero atoms may be present in radicals such as iminobisethyl.

(b) divalent aromatic homocyclic radicals in which at least one of the terminal links is through an aliphatic carbon atom, for example as in the benzylene —C₆H₄.CH₂— or the xylylene —CH₂C₆H₄CH₂— group;

(c) divalent monocyclic or fused polycyclic aromatic radicals other than phenylene, for example of the benzene, naphthalene, anthraquinone or fluorene series, such as

| | |
|---|---|
| 3-sulpho-1,4-phenylene | 2-nitro-1,4-phenylene |
| 4-sulpho-1,3-phenylene | 4-methoxy-1,3-phenylene |
| 4-nitro-1,3-phenylene | 3,7-disulpho-1,5-naphthylene: |
| 2-chloro-1,4-phenylene | 2-methoxy-1,4-phenylene |

(d) divalent radicals wherein the terminal bonds are attached to carbon atoms of two phenyl or naphthalene nuclei which are joined together either through a direct link or through an atom or chain of atoms, other than vinylene, which may form a homocyclic or heterocyclic ring. Of this type, there may be mentioned as examples divalent radicals derived from

| | |
|---|---|
| diphenyl | azobenzene |
| diphenyloxide | diphenyloxadiazole |
| diphenylamine | benzanilide |
| diphenylsulphide | diphenylurea |
| diphenylsulphone | 1,2-bis-(phenylcarbamyl)ethylene |
| diphenylmethane | 1,4-bis-(phenylcarbamyl)butadiene |
| diphenylketone | 1,2-bis-(phenylcarbamyl)ethane |
| diphenylethane | 1,3-bis-(phenylcarbamyl)propane |
| diphenylethylene | | and (e) nuclear substituted derivatives of the above, for example, containing methyl, nitro, and/or sulphonic acid and/or chlorine atoms as substituents in the phenyl or naphthalene nuclei.

Alternatively, the group —NR¹LNR² — can form a piperazine residue of the formula:

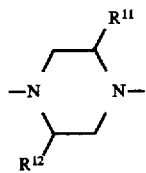

in which each of $R^{11}$ and $R^{12}$, independently, represents H or $C_{1-6}$-alkyl.

As indicated above, the compounds of Formula 1 are free from fibre-reactive groups. Such groups have been fully described in the prior art, for example on our EP-A-0356014.

The compounds of Formula (1) may be in the free acid form as shown but are preferably in the form of water-soluble salts, especially alkali metal, ammonium or substituted ammonium salts.

The compounds of Formula (1) may be prepared by methods analogous to those described in the prior art for similar bisazo compounds. Thus, for example, a suitable method comprises (i) diazotising an aromatic amine or amines of the formula:

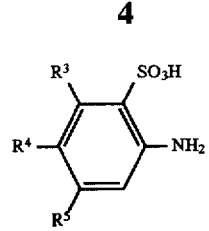

to form the corresponding diazonium salt(s);

(ii) condensing 8-amino-1-naphthol-3,6-disulphonic acid (H acid) with cyanuric chloride, preferably in the presence of a base, to form 8-(4,6-dichlorotriazin-2-ylamino)-1-naphthol-3,6-sulphonic acid;

(iii) coupling the diazonium salt(s) with the dichlorotriazinylamino compound to form a monoazo compound or compounds of the formula;

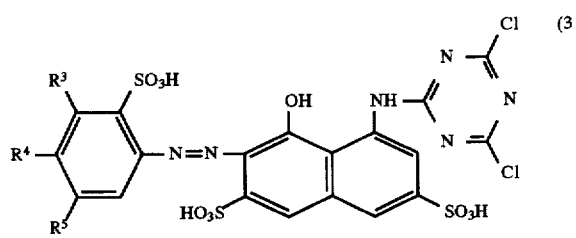

(iv) condensing 2 moles of monoazo compound(s) of Formula (3) with one molar proportion of a diamine of formula NHR¹L—NR²H, and (v) condensing the disazo product from (iv) with two molar proportions of a compound of formula L¹H, preferably in the presence of a base;

wherein $R^3$, $R^4$, $R^5$, L and $L^1$ are as defined above, the reactants being selected so that the final product is free from fibre-reactive groups and also so that any carboxyl substituents present in the product are in the form of one or more residue of the following formulae:

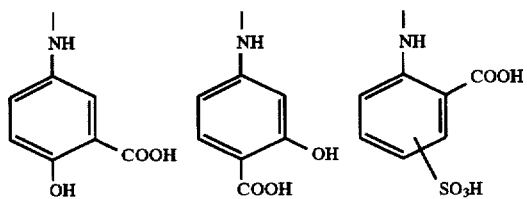

As examples of amines of Formula (2) which may be used in the preparation of compounds of Formula (1), there may be mentioned orthanilic acid, 2-amino-5-methylbenzenesulphonic acid, 2-amino-5-methoxybenzenesulphonic acid, 2-amino-5-acetylaminobenzenesulphonic acid, 2-amino-5-chlorobenzenesulphonic acid and 2-amino-4,5-dimethylbenzenesulphonic acid.

As examples of diamines of formula NHR¹LNR²H, there may be mentioned piperazine, 2,5-dimethylpiperazine, 2-, 3- and 4-aminobenzylamines, o-, m- and p-xylylene diamines and phenylene diamines.

As examples of compounds of formula L¹H, there may be mentioned phenols and alcohols such as methanol and ethanol but especially primary and secondary aliphatic and aromatic amines for example ethanolamine and 2-aminomethyltetrahydrofuran, ammonia and heterocyclic bases such as morpholine.

The reactions leading to the formation of the compounds of the invention may be performed using conditions that have been fully described in the prior art for such reactions. Similarly, the compounds may be isolated by known methods, for example spray drying or precipitation and filtration.

According to a further feature of the present invention there is provided an ink composition comprising a bisazo compound of Formula (1) or salts thereof and a medium.

A compound of the present invention is a useful colorant for an ink, and exhibits high solubility in water and aqueous media and good water fastness and gives a print with a strong magenta shade on plain paper.

The present ink composition may comprise a mixture of two or more different compounds of Formula (1) or salts thereof or may comprise a mixture of one or more compounds of Formula (1) or salts thereof with one or more other compounds such as other azo compounds.

The compounds are versatile, exhibiting high water fastness and rapid fixation on alkaline, neutral and acid papers and good solubility in aqueous ink media.

A suitable ink composition comprises a compound according to the present invention and a liquid medium, preferably an aqueous medium. It is preferred that the compound is completely dissolved in the liquid medium to form a solution.

The ink preferably contains from 0.5% to 20%, more preferably from 0.5% to 15%, and especially from 1% to 3%, by weight of the compound based on the total weight of the ink. Although many inks contain less than 5% by weight of colorant, it is desirable that the compound has a water solubility of around 10% or more to allow the preparation of concentrates from which more dilute inks can be prepared and to minimise the chance of precipitation of colorant if evaporation of solvent occurs during use of the ink.

The liquid medium is preferably water or a mixture of water and one or more water-soluble organic solvent. The weight ratio of water to organic solvent(s) is preferably from 99:1 to 1:99, more preferably from 95:1 to 50:50 and especially from 90:10 to 60:40.

The water-soluble organic solvent is preferably selected from $C_{1-4}$-alkanols such as methanol, ethanol, n-propanol, isopropanol, n-butanol, sec-butanol, tert-butanol, isobutanol or n-pentanol; amides such as dimethylformamide or dimethylacetamide; ketones or ketone-alcohols such as acetone or diacetone alcohol; ethers such as tetrahydrofuran or dioxane; oligo- or poly-alkyleneglycols such as diethylene glycol, triethylene glycol, polyethylene glycol or polypropylene glycol; alkenyleneglycols or thioglycols containing a $C_2-C_6$-alkylene group such as ethylene glycol, hexyleneglycol, propylene glycol, butylene glycol, pentylene glycol or hexylene glycol and thioglycol; polyols such as glycerol or 1,2,6-hexanetriol; $C_{1-4}$-alkyl-ethers of polyhydric alcohols such as 2-methoxyethanol, 2-(2-methoxyethoxy)ethanol, 2-(2-ethoxyethoxy)-ethanol, 2-[2-(2- methoxyethoxy) ethoxy]ethanol, 2-[2-(2-ethoxyethoxy) -ethoxy]-ethanol, ethylene glycol monoallyl ether; heterocyclic ketones, such as 2-pyrrolidone, N-methyl-2-pyrrolidone, N-ethyl-2-pyrrolidone and 1,3-dimethylimidazolidone, sulphoxides such as dimethylsulphoxide and sulpholane; or mixtures containing two or more of the aforementioned water-soluble organic solvents for example thiodiglycol and a second glycol or diethylene glycol and 2-pyrrolidone.

Preferred water-soluble organic solvents are 2-pyrrolidone; N-methylpyrrolidone; alkylene glycols and oligo-alkylene glycols, such as ethylene glycol, diethylene glycol, triethylene glycol; and lower alkyl ethers of polyhydric alcohols such as 2-methoxy-2-ethoxy-2-ethoxyethanol; and polyethylene glycols with a molecular weight of up to 500. A preferred specific solvent mixture is a binary or ternary mixture of water and diethylene glycol and/or, 2-pyrrolidone or N-methylpyrrolidone in weight ratios 75–95:25–5 and 60–80:0–20:0–20 respectively.

Examples of suitable ink media are given in U.S. Pat. No. 4,963,189, U.S. Pat. No. 4,703,113, U.S. Pat. No. 4,626,284 and EP-A-0425150.

A further aspect of the present invention provides a process for printing a substrate with an ink composition using an ink jet printer, characterised in that the ink contains at least one compound according to the first aspect of the present invention.

A suitable process for the application of an ink as hereinbefore defined comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

The substrate used in the inkjet printing process may be paper, plastics, textile, metal or glass and is preferably paper, plastic or a textile material, especially a natural, semi-synthetic or synthetic material.

Examples of natural textile materials include wool, silk, hair and cellulosic materials, particularly cotton, jute, hemp, flax and linen.

Examples of synthetic and semi-synthetic materials include polyamides, polyesters, polyacrylonitriles and polyurethanes.

Preferred substrates include overhead projector slides or papers, including plain and treated papers, which may have an acid, alkaline or neutral character or textile materials such as cotton. An especially preferred substrate is paper.

The preferred ink used in the process is as hereinbefore described.

According to a further aspect of the present invention there is provided a paper or an overhead projector slide or textile material printed with an ink composition characterised in that the ink composition comprises at least one compound of Formula (1) or salt thereof.

According to a further aspect of the present invention there is provided a process for the coloration of a textile material with any of the abovementioned ink compositions which comprises the steps:

i) applying to the textile material by inkjet printing the ink composition; and ii) heating the textile material at a temperature from 50° C. to 250° C. to fix the compound on the material.

The process for coloration of a textile material by inkjet printing preferably comprises a pre-treatment of the textile material with an aqueous pre-treatment composition comprising a water-soluble base, a hydrotropic agent and a thickening agent followed by removing water from the pre-treated textile material to give a dry pre-treated textile material which is subjected to inkjet printing in step i) above.

The pre-treatment composition preferably comprises a solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pre-treatment to promote the dyeing of the pre-treated textile material. Where the base is sodium bicarbonate it is convenient to use a concentration of from 1% to 5% by weight based on the total weight of the composition.

The hydrotropic agent is present to provide sufficient water to promote the fixation reaction between the compound and the textile material during the heat treatment, in step (d) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive compounds. Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pre-treatment composition.

The remainder of the pre-treatment composition is preferably water, but other ingredients may be added to aid fixation of the compound to the textile material or to enhance the clarity of print by inhibiting the diffusion (migration) of compound from coloured areas to non-coloured areas before fixation.

Examples of fixation enhancing agents are cationic polymers, such as a 50% aqueous solution of a dicyanamide/phenol formaldehyde/ammonium chloride condensate e.g. MATEXIL FC-PN (available from ICI), which have a strong affinity for the textile material and the compound and thus increase the fixation of the compound on the textile material.

Examples of anti-migration agents are low molecular weight acrylic resins, e.g. polyacrylates, such as poly(acrylic acid) and poly(vinyl acrylate).

In the pre-treatment stage of the present process the pre-treatment composition is preferably evenly applied to the textile material. Where a deeply penetrated print or a deep shade is required the pre-treatment composition is preferably applied by a padding or similar process so that it is evenly distributed throughout the material. However, where only a superficial print is required the pre-treatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. The ink composition, preferably also contains a humectant to inhibit evaporation of water and a preservative to inhibit the growth of fungi, bacteria and/or algae in the solution. Examples of suitable humectants are, propan-1,2-diol, butan-1,2-diol, butan-2,3-diol and butan-1,3-diol. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the compound on the textile material as this has been found to minimise the diffusion of the compound from printed to non-printed regions. As with the pre-treated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes. If a steam (wet) heat treatment is used, the printed material is preferably maintained at 100°–105° C. for from 5 to 15 minutes whereas if a dry heat treatment is employed the printed material is preferably maintained at 140°–160° C. for from 2 to 8 minutes.

After allowing the textile material to cool, unfixed compound and other ingredients of the pre-treatment and compound compositions may be removed from the textile material by a washing sequence, involving a series of hot and cold washes in water and aqueous detergent solutions before the textile material is dried.

According to further aspects of the present invention there are provided textile materials, especially cellulosic textile materials, coloured with any of the ink compositions according to the present invention or by means of the process according to the present invention.

The invention is further illustrated but not limited by the following Examples.

EXAMPLE 1

2-Amino-5-methylbenzenesulphonic acid (9.3 g) was dissolved in water (200 cm$^3$) at pH 8 and sodium nitrite (3.8 g) was added. The mixture was added to ice/water/concentrated HCl (25 cm$^3$) at a temperature below 5° C. over 10 mins and stirred for 2 h. Excess nitrous acid was destroyed by the addition of 10% aqueous sulphamic acid.

1-Amino-8-naphthol-3,6-disulphonic acid (19.5 g) was dissolved in water (400cm$^3$) at pH6.

Cyanuric chloride (10 g) was dissolved in acetone (100 cm$^3$) and added to ice/water and the above prepared H acid solution was added to this suspension over 5 mins at 0°–5° C. Stirring was maintained at 0°–5° C. for 2 hours, the solution was filtered and then added to the diazo solution prepared as described above.

The pH of the coupling reaction was adjusted to 7 over 1 h by the addition of 2N sodium hydroxide solution. Stirring was continued for a further 2 hours at pH 7 and the total volume was adjusted to 1600 cm³.

To 800cm³ of the above prepared solution of dichlorotriazinyl monoazo compound was added 2,5-dimethylpiperazine (1.28 g) and the pH value was adjusted to 9. After stirring overnight, the pH was adjusted to 7 by the addition of 2N hydrochloric acid. The bis(monochlorotriazinyl azo) compound so formed was salted out by the addition of 10% ammonium chloride solution, filtered off, washed with saturated ammonium chloride solution and dried at 50° C.

The bis(monochlorotriazinylazo) compound (1.85 g) was dissolved in water (25 cm³), ethanolamine (0.31 g) was added and the reaction mixture was heated to 70°–75° C. for 3 hours. After dialysis, the product was dried at 70° C. overnight.

When dissolved in an aqueous ink medium and printed on to plain paper using a thermal ink-jet printing machine, the product gave bright magenta shades having good water fastness and good light fastness.

The following tables summarise further bisazo compounds of Examples 2 to 12 of formula

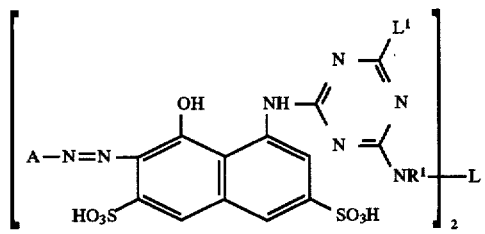

which were prepared by coupling a diazotised aromatic amine ANH₂ with dichlorotriazinyl acid and then reacting the dichlorotriazinyl monoazo compound first with a diamine L(NR¹H)₂ and second with a compound of the formula L¹H.

| Example | ANH₂ | L(NR¹H)₂ | L¹H |
|---|---|---|---|
| 2 | 2-amino-5-methylbenzene sulphonic acid | 2,5-dimethylpiperazine | ammonia |
| 3 | 2-amino-5-methylbenzene sulphonic acid | 2,5-dimethylpiperazine | 2-(aminomethyl)tetrahydrofuran |
| 4 | 2-amino-5-methylbenzene sulphonic acid | m-xylylene diamine | 2-(aminomethyl)tetrahydrofuran |
| 5 (S166969) | 2-amino-4,5-dimethylbenzene sulphonic acid | 2,5-dimethylpiperazine | ethanolamine |
| 6 | 2-amino-4,5-dimethylbenzene sulphonic acid | 2,5-dimethylpiperazine | 2-(aminomethyl)tetrahydrofuran |
| 7 | 2-amino-4,5-dimethylbenzene sulphonic acid | 2,5-dimethylpiperazine | ammonia |
| 8 | 2-amino-4,5-dimethylbenzene sulphonic acid | m-xylylene diamine | ethanolamine |
| 9 | 2-amino-4,5-dimethylbenzene sulphonic acid | p-xylylene diamine | ethanolamine |
| 10 | orthanilic acid | 2,5-dimethylpiperazine | ethanolamine |
| 11 (S113670) | 2-amino-5-methylbenzene sulphonic acid | piperazine | ethanolamine |

-continued

| Example | ANH₂ | L(NR¹H)₂ | L¹H |
|---|---|---|---|
| 12 (S113671) | 2-amino-5-methylbenzene sulphonic acid | piperazine | piperazine |

When dissolved in an aqueous ink medium and printed onto plain paper using a thermal ink-jet printing machine, the compounds of Examples 2–12 gave results similar to those given by the product of Example 1.

We claim:

1. A bisazo compound of the Formula (1) or a salt thereof:

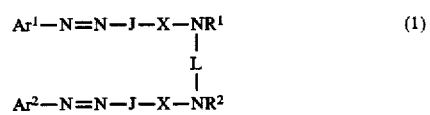

wherein $Ar^1$ and $Ar^2$, which may be the same or different, represent groups of the formula:

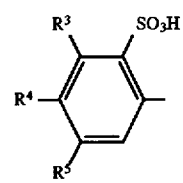

wherein each of $R^3$, $R^4$ and $R^5$, independently, represents H, halogen, alkyl, alkoxy or acylamino;

J represents

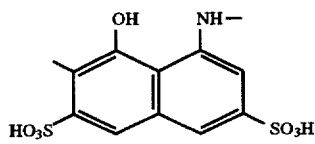

L represents a divalent organic linking group other than phenylene, benzylene, diphenylamine, optionally substituted pyridinylene optionally substituted vinylene bis-phenyl or optionally substituted vinylene bis-naphthyl and each of $R^1$ and $R^2$, independently, represents H or optionally substituted hydrocarbyl or $R^1$ and/or $R^2$ together with L and the attached nitrogen atom(s) form a piperazine ring provided that the group —NR¹LNR²— does not comprise a residue of the formula:

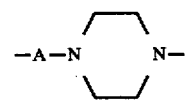

wherein A represents an optionally substituted alkylene group containing 2 or more carbon atoms, and X represents

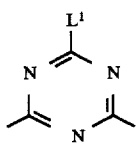

wherein $L^1$ represents —$OR^6$—, —$SR^6$ or —$NR^7R^8$ in which each of $R^6$, $R^7$ and $R^8$, independently, represents H or optionally substituted hydrocarbyl free from residues of the formula —A—$NR^9R^{10}$ wherein A is as defined above and each of $R^9$ and $R^{10}$, independently, represents H or optionally substituted hydrocarbyl or $R^9$ and $R^{10}$ together with the attached nitrogen atom form a 5- or 6-membered ring;

or $R^7$ and $R^8$ together with the attached nitrogen atom form a 5- or 6-membered ring other than a piperazine ring, the compounds of Formula (1) being free from fibre-reactive groups and any carboxyl substituents present in the compounds being attached in the form of one or more residue of the following formulae:

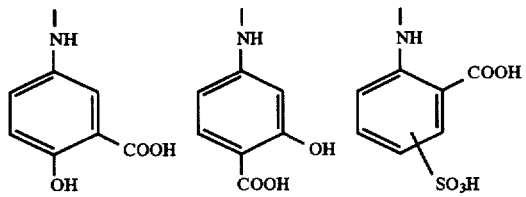

2. A bisazo compound of the Formula (1) or a salt thereof:

$$Ar^1—N=N—J—X—NR^1 \atop \phantom{Ar^1—N=N—J—X—N}L \atop Ar^2—N=N—J—X—NR^2} \qquad (1)$$

wherein $Ar^1$ and $Ar^2$, which may be the same or different, represent groups of the formula:

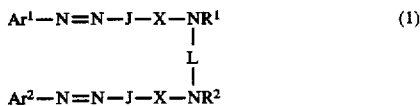

wherein each of $R^3$, $R^4$ and $R^5$, independently, represents H, halogen, alkyl, alkoxy or acylamino;

J represents

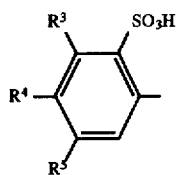

each of $R^1$ and $R^2$, independently, represents H or optionally substituted hydrocarbyl;

L represents a divalent organic linking group other than phenylene, diphenylamine optionally substituted vinylene bis-phenyl or optionally substituted vinylene bis-naphthyl selected from the group consisting of:
(a) an optionally substituted divalent aliphatic radical containing from 2 to 6 carbon atoms;

(b) an optionally substituted divalent monocyclic or fused polycyclic aromatic radical of the benzene, naphthalene, anthraquinone or fluorene series;

(c) a divalent radical wherein the terminal bonds are attached to carbon atoms of two optionally substituted phenyl or naphthyl nuclei which are joined together either through a direct link or through an atom or chain of atoms which may form a homocyclic or heterocyclic ring; and (d) xylylene; or the group —$NR^1LNR^2$— forms a piperazine residue of the formula:

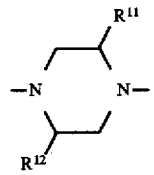

wherein:
each of $R^{11}$ and $R^{12}$, independently, represents H or $C_{1-6}$-alkyl;
provided that the group —$NR^1LNR^2$— does not comprise a residue of the formula:

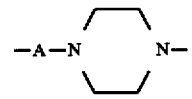

wherein A represents an optionally substituted alkylene group containing 2 or more carbon atoms;
and X represents

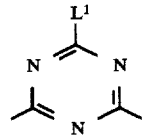

wherein $L^1$ represents —$OR^6$—, —$SR^6$ or —$NR^7R^8$ in which each of $R^6$, $R^7$ and $R^8$, independently, represents H or optionally substituted hydrocarbyl free from residues of the formula —A—$NR^9R^{10}$ wherein A is as defined above and each of $R^9$ and $R^{10}$, independently, represents H or optionally substituted hydrocarbyl or $R^9$ and $R^{10}$, together with the attached nitrogen atom form a 5-or 6-membered ring;

or $R^7$ and $R^8$ together with the attached nitrogen atom form a 5-or 6-membered ring other than a piperazine ring, the compounds of Formula (1) being free from fibre-reactive groups and any carboxyl substituents present in the compounds being attached in the form of one or more residue of the following formulae:

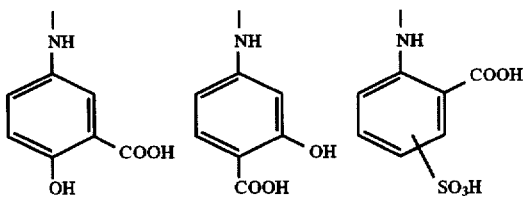

3. A compound according to either one of claim 1 or claim 2 wherein $L^1$ represents —$SR^6$ or —$NR^7R^8$.

4. A compound according to claim 2 wherein the group —NR¹LNR²-forms a piperazine residue as defined in claim 2.

5. An ink composition comprising a solution of a compound or salt thereof according to claim 1 in an aqueous medium.

6. A process for printing a substrate with an ink composition by applying to the substrate with an ink-jet printer an ink composition comprising at least one compound or salt thereof according to claim 1 in an aqueous medium.

7. A paper or an overhead projector slide or textile material printed with an ink composition characterised in that the ink composition comprises at least one compound or salt thereof according to claim 1.

8. A process for the coloration of a textile material with an ink composition which comprises the steps:

i) applying to the textile material by ink jet printing the ink composition; and ii) heating the textile material at a temperature from 50° C. to 250° C. to fix the compound on the material;

wherein the ink composition comprises a solution in an aqueous medium of a bisazo compound of the Formula (1) or a salt thereof:

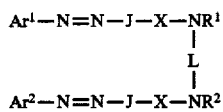  (1)

wherein Ar¹ and Ar², which may be the same or different, represent groups of the formula:

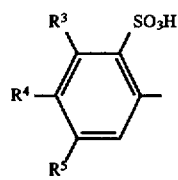

wherein each of R³, R⁴ and R⁵, independently, represents H, halogen, alkyl, alkoxy or acylamino;

J represents

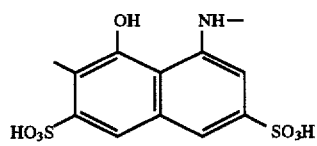

L represents a divalent organic linking group other than phenylene, optionally substituted vinylene bis-phenyl or optionally substituted vinylene bis-naphthyl and each of R¹ and R², independently, represents H or optionally substituted hydrocarbyl or R¹ and/or R² together with L and the attached nitrogen atom(s) form a 5-or 6-membered ring provided that the group —NR¹LNR²— does not comprise a residue of the formula:

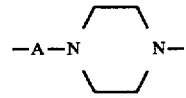

wherein A represents an optionally substituted alkylene group containing 2 or more carbon atoms, and X represents

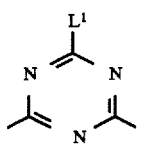

wherein L¹ represents —OR⁶—, —SR⁶ or —NR⁷R⁸ in which each of R⁶, R⁷ and R⁸, independently, represents H or optionally substituted hydrocarbyl free from residues of the formula —A—NR⁹R¹⁰ wherein A is as defined above and each of R⁹ and R¹⁰, independently, represents H or optionally substituted hydrocarbyl or R⁹ and R¹⁰, together with the attached nitrogen atom form a 5-or 6-membered ring;

or R⁷ and R⁸ together with the attached nitrogen atom form a 5-or 6-membered ring other than a piperazine ring, the compounds of Formula (1) being free from fibre-reactive groups and any carboxyl substituents present in the compounds being attached in the form of one or more residue of the following formulae:

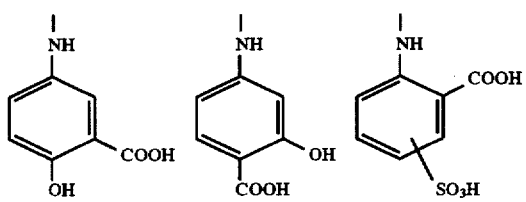

9. A textile material coloured with an ink composition according to claim 5.

10. A textile material coloured by means of the process according to claim 8.

* * * * *